July 13, 1965            L. GILMAN            3,194,103
SHEAR CONSTRUCTION HAVING FLEXIBLE, PROGRESSIVELY
CUTTING BLADES
Filed April 4, 1962            3 Sheets-Sheet 1
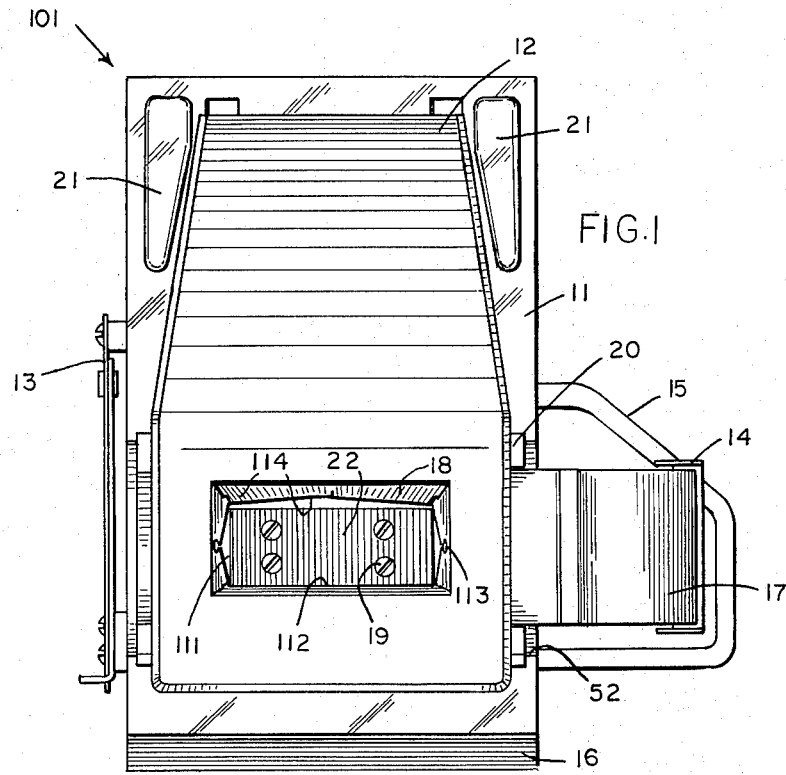
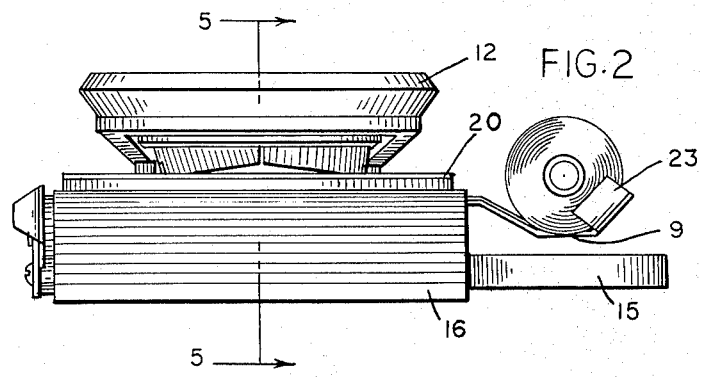
INVENTOR.
LOUIS GILMAN
BY
*Ezekiel Wolf, Wolf, & Greenfield*
ATTORNEYS July 13, 1965   L. GILMAN   3,194,103
SHEAR CONSTRUCTION HAVING FLEXIBLE, PROGRESSIVELY
CUTTING BLADES
Filed April 4, 1962   3 Sheets-Sheet 2
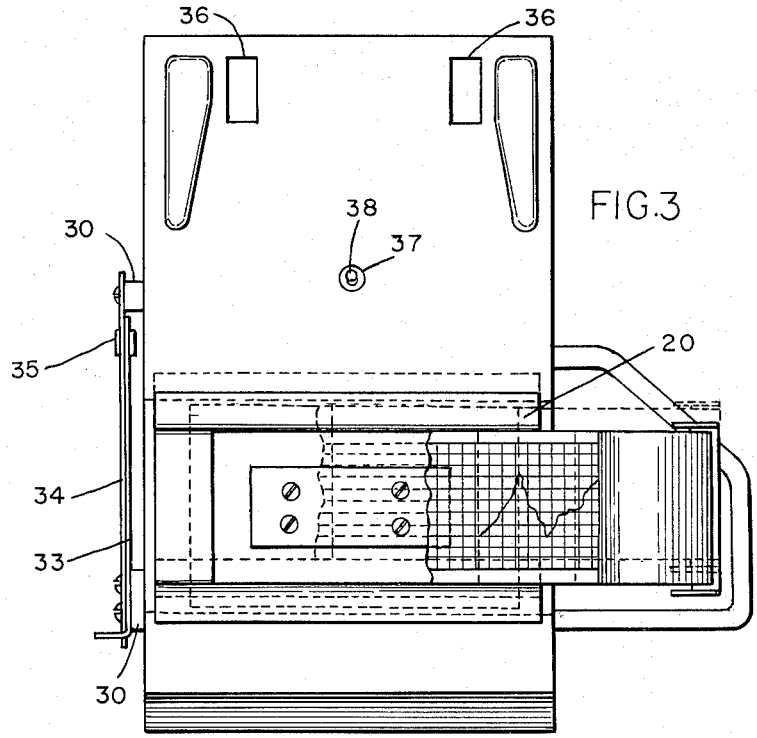
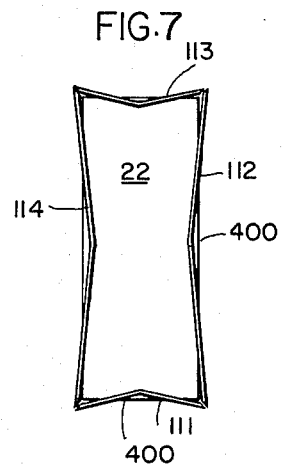
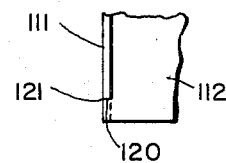
INVENTOR.
LOUIS GILMAN
BY
Ezekiel Wolf, Wolf & Greenfield
ATTORNEYS July 13, 1965
L. GILMAN
3,194,103
SHEAR CONSTRUCTION HAVING FLEXIBLE, PROGRESSIVELY
CUTTING BLADES
Filed April 4, 1962
3 Sheets-Sheet 3
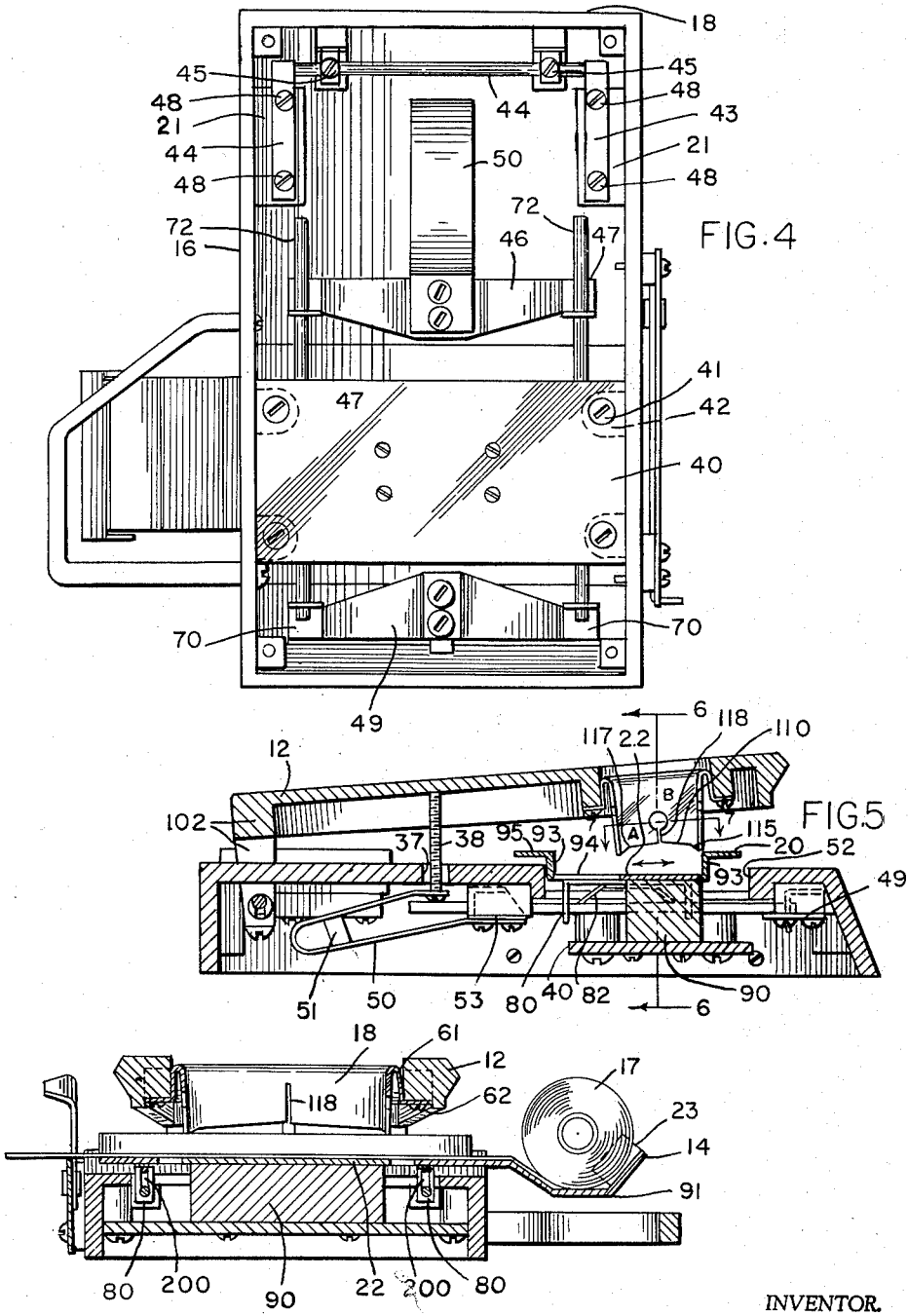
INVENTOR.
LOUIS GILMAN
BY
Ezekiel Wolf, Wolf & Greenfield
ATTORNEYS

United States Patent Office 3,194,103
    Patented July 13, 1965

3,194,103
SHEAR CONSTRUCTION HAVING FLEXIBLE, PROGRESSIVELY CUTTING BLADES
Louis Gilman, 138 Albemarle Road, Newtonville, Mass.
Filed Apr. 4, 1962, Ser. No. 185,139
6 Claims. (Cl. 83—589)

The present invention relates to a shear construction particularly useful for cutting selected portions from surrounding sheet material.

It has frequently been found difficult to cut selected portions or sections from a surrounding sheet of material in a neat and rapid manner. This procedure may be necessary when rolls of graph paper are employed to record data obtained by monitoring techniques such as electrocardiograph procedures. For example, an electrocardiograph may be recorded by a trained technician who may then select portions thereof for transmittal to medical practitioners for immediate study and later preservation as permanent records. In such procedures, it is important that selected recorded data portions be rapidly and neatly severed from surrounding data.

Accordingly it is an object of this invention to provide a shear for rapidly and neatly cutting selected sections from surrounding sheet material. The shear of this invention is compact and thus may be easily transported to desired locations. The device provides for rapid adjustment of sheet material to be cut. In a preferred embodiment of the invention, the device provides a second cutting means for trimming a sheet of material.

The shear of this invention generally comprises a shear blade assembly positioned above a sheet backing plate having an outer peripheral edge. The shear blade assembly comprises a resilient cutting edge adapted to engage and disengage the outer peripheral edge of the sheet backing plate. The shear blade assembly cutting edge extends in a plurality of planes, with each of the planes intersecting the peripheral edge for successively engaging selected portions of the cutting edge with the outer peripheral edge of the sheet backing plate in a shearing action. In a preferred form the shear blade assembly provides four cutting blades rectangularly arranged and located by a flexible spring portion. The lower or cutting edge of each blade preferably has a substantially inverted bow or V-shape and is inwardly bowed or V-shaped. In the preferred embodiment the shear provides an adjustment frame which allows preselected positioning of a sheet to be cut in the shear of this invention. An affixed scissor unit having a stationary blade and a pivotably mounted blade is provided on a side of the shear.

Other features, objects and advantages of the present invention will become apparent from the following specification when read in connection with the accompanying drawing, in which:

FIG. 1 is a top plan view of a preferred embodiment of a shear of this invention;

FIG. 2 is a front view thereof;

FIG. 3 is a top view thereof with a section removed;

FIG. 4 is a bottom view thereof;

FIG. 5 is a cross sectional view through line 5—5 of FIG. 2;

FIG. 6 is a cross sectional view taken through line 6—6 of FIG. 5; and

FIG. 7 is a cross sectional view taken through line 7—7 of FIG. 5

FIG. 7a is a fragmentary view of a lower corner of a shear blade assembly of this invention.

A preferred embodiment of the shear of this invention is designated generally at 101 and has a generally rectangular housing base 11 with four downwardly depending generally rectangular side walls 16. A substantially planar rectangular sheet backing plate 22 is affixed in a stationary position within a rectangular opening 52 in the mounting base 11 by means of a supporting block 90 attached to the backing plate preferably by screws 19. The backing plate 22 has an outer peripheral edge 400 adapted to be engaged with a blade cutting edge as will be more fully described hereinafter. The supporting block 90 is supported by a planar rectangular support plate 40 which is attached to the mounting base 11 by screw and ear means 41 and 42 respectively.

A roll support tray 14, seen most clearly in FIG. 6, is integrally attached to a movable adjustment frame 20. The roll support tray is indented at a portion 91 thereof and carries ears 23 on side thereof so as to enable a roll of graph paper to be loaded on the shear. The adjustment frame 20 is substantially rectangular and provides two upstanding walls 93 on opposite sides thereof each of the walls having an outstanding flange 95. A substantially planar rectangular frame portion 94 is located so as to lie in substantially the same plane as a surface of the sheet backing plate 22. Walls 93 are substantially parallel and preferably positioned apart from each other the same distance as the width of the roll of graph paper 17 as most clearly seen in FIG. 1. The adjustment frame 20 is slidably mounted on circular guides 72 by C-shaped downwardly depending arms of a bracket member 80 provided on either end of the adjustment frame. The downwardly depending arms of the C-shaped bracket members 80 have vertically elongated slots 200 therein. Generally C-shaped spring members 82 are provided under and affixed to each bracket member 80. The spring members have downwardly depending legs which spring bias the lower ends of slots 200 against guides or bars 72. Thus, the adjustment frame may slide horizontally along bars 72. The adjustment frame 20 may also be resiliently depressed in a vertical direction against the action of spring members 82. In some embodiments of the invention, the flanges 95 in conjunction with spring members 82 may be adapted to provide a resilient spring stop for downward movement of actuating member 12. The bars 72 are fixedly mounted in holes provided in L-shaped mounting members 70 at the front end of the shear. The mount-members 70 are preferably affixed to the under portion of the mounting base 11 by a central cross bar 49 screwed to the mounting base. The rear ends of the bars 72 are fixedly mounted in holes provided in L-shaped ends 47 of a cross bar 46 which is firmly affixed to the under portion of the housing base 11 by screw means.

A carrying handle 15 is provided directly below the roll support tray 14 and is mounted on a side wall 16 of the housing. The handle may be positioned at any desired point on the machine however in the location disclosed the minimum number of extensions from the shear is provided.

A scissor unit 13 is provided on a wall 16 opposite the roll support tray 14. The scissor unit comprised a horizontal stationary scissor blade 34 affixed to a wall 16 by attachment blocks 30 at either end thereof and screws threaded into the wall. A scissor blade 33 is pivotally mounted on the stationary scissor blade 34 by means of a pivot pin 35. A tab extending normal to the pivotably scissor blade 33 is provided for opening and closing the scissor unit as will be described hereinafter.

A flat actuating member 12 having downwardly extending spaced legs 102 is fixed mounted on a horizontally extending bar 44. The bar 44 is journaled for pivotable rotation on support blocks 43. The support blocks 43 are attached to a thickened under portions 21 of the housing base by means of screws 46. Legs 102 are firmly affixed to the bar 44 by means of lock screws 45. The actuating arm 12 is held in its resting position as shown in FIG. 5 by means of a projection such as bolt 38 passing through a cut out portion 37 of the housing base 11. The screw 38 is mounted at its lower end by a U-shaped spring member 50 having a stiffener block 51 located at one end thereof. The spring member 50 is preferably a flat band however other springs may be employed if desired. A mounting block 53 provides a mounting for a stationary end of the spring 50.

A shear blade assembly 18 is located in a recessed rectangular opening of a forward end of the actuating member 12 substantially above the sheet backing plate 22.

In the preferred embodiment of the invention four substantially vertically inclined rectangularly arranged cutting blades 111, 112, 113 and 114 are provided. The upper end of each blade has a reversely bent section as shown most clearly in FIGS. 6 at 61 which is affixed to a lower ridge on actuating member 12 by an outwardly extending flange 62 which is preferably held in position by screws or other attachment means. The blades are composed of a resilient material such as a spring steel and are resiliently flexible towards and away from the edge 400 as will be described. The reversely bent section is in effect a spring section. As best shown in FIG. 5 the lower cutting edge 110 of each blade is generally bowed or V-shaped so as to provide cutting points 115 and 117 at the outermost portions of the blade. A vertically extending slot 118 is provided substantially centrally within the planar portion of each blade thus dividing the blade into two substantially equal parts. The slot 118 may be a keyhole slot as shown in FIG. 5. Parts A and B of each blade are preferably disposed at a slight angle to each other so that a bowed or V-shaped blade in cross section is provided with the central point of the V projecting inwardly of a rectangle which would otherwise be formed by the blades.

The particular shape of the blades as noted above is an important feature of the present invention. As clearly shown in FIGS. 5 and 7, in the resting position of the shear construction the shear blade assembly is spaced from the plane of the sheet backing plate 22. A cutting edge formed by the lower portions of the blades 111, 112, 113 and 114 extends in a plurality of planes with each of the planes adapted to move over arcs toward the peripheral edge 400 of the sheet backing plate. The blades form an inner perimeter adapted to reciprocate substantially perpendicular to the outer perimeter or plane of the peripheral edge 400. The blades are not affixed to each other at their edges and may flex individually outwardly so that the inner perimeter of the cutting edge formed by the blades is resiliently reciprocal between an area smaller than that defined by the edge 400 and an area slightly larger than the perimeter defined by 400. When the actuating member 12 is fully depressed the blades are individually flexed outwardly and the cutting edge formed by the blades surrounds and is adjacent the peripheral edge 40. Preferably the corners of the blade adjoin each other and have overlapping ears and grooves 120 and 121 respectively as shown in FIG. 7a which tend to stabilize the lower ends of the blade and provides a substantially continuous corner cutting portion.

It should be understood that although I have illustrated four blades and a specific arrangement it is possible to utilize various numbers of blades and arrangements. For example, the parts A and B may comprise individual blades if desired. A plurality of slots may be employed in each blade or a plurality of blades may be employed on each side of the backing plate. The plate 22 and blade assembly 18 may be square, triangular or irregular in configuration. The terms bowed or V-shaped are employed to indicate the successive, resilient point contact of the cutting edge with the peripheral edge 400. However, these terms are intended to cover the use of a plurality of point contacts of each blade with the peripheral edge 400.

The shear of the present invention may be operated rapidly and efficiently to produce cut sections having a neat artistic appearance. A roll of graph paper 17 which has previously had data recorded thereon is placed in the roll support 14 of the machine. A section of the roll is then pulled off the roll to form a sheet within the shear as best seen in FIG. 6. The sheet section of the graph paper is located on the adjustable frame 20 and the frame 20 is slid along the bars 72 until the selected portion along the width of the graph paper to be cut is located on the backing plate 22. The operator can determine which section will be cut by the shear by merely looking down into the rectangle formed by the shear blade assembly 18. After the section to be cut is properly located, bond pressure is applied to the actuating member 12 causing pivotable movement thereof around a central axis of mounting bar 44. The pivoting movement of the actuating member causes the shear blade assembly to cut a selected section from the graph paper. It is important to note that the blades will first pierce the graph paper at the corners of the rectangle formed by the cutting edge 110 and then proceed to cut the graph paper along the cutting edge simultaneously at two successive points on each side of the rectangle. Because of the point cutting provided by the shear of this invention, the cut edge produced in paper or plastic sheets is highly satisfactory and neat in appearance. The inwardly bowed or V-shape of each individual blade provides a means for resiliently flexing the blade against the outer perimeter of the backing plate as the sheet material is being cut. The end of the cutting action is reached when the plane of the acauating member 12 is substantially parallel to the plane of the housing base member 11. At this point pressure may be released from the actuating member and spring 50 resiliently urges the actuating member upwardly to its original position. The cut out section of the graph paper may be easily removed from the shears by hand and the paper further unrolled and positioned between the blades of the scissor unit 13 as shown in FIG. 6. Pivotable movement of the pivot blade 33 may be employed to close the scissor unit and trim unwanted edges of the graph paper. Successive sections of graph paper can be cut by following the above procedure.

From the above disclosure it will be readily understood that the shear of this invention provides a rapid and efficient compact device for cutting sections out of surrounding sheet material. The preferred embodiment is particularly designed for cutting material such as paper, plastics and the like in sections of approximately 2 x 4 inches. However other sizes and types of materials may be employed.

Numerous modifications of and departures from the specific embodiment described herein may be practiced by those skilled in the art without departing from the inventive concepts. Consequently, the invention is to be construed as limited only by the spirit and scope of the appended claims.

What is claimed is:

1. A shear construction for cutting portions of a sheet comprising, means having a peripheral edge forming a backing for a sheet, blade forming means comprising a plurality of blades extending in a plurality of planes including at least one set of substantially opposite parallel blades, means enabling each blade to flex separately, said blade forming means having cutting edges adapted to move over arcs, said arcs extending toward said peripheral edge, and means for moving said blade forming means towards said backing means whereby successive portions of said cutting edge will be engaged by said peripheral edge in a shearing action.

2. A shear construction for cutting selected portions from a surrounding sheet, said shear construction comprising,
- means forming a backing for a sheet to be cut, said means comprising an outer plural sided backing edge forming a substantially planar outer perimeter,
- a resilient shear blade assembly reciprocally mounted in spaced relation to said backing means,
- said shear blade assembly comprising a plurality of cutting blades having ends positioned adjacent each other and defining a lower closed continuous cutting edge having an inner perimeter adapted to reciprocate substantially normally of said substantially planar outer perimeter,
- said inner perimeter being adapted to be resiliently reciprocal between an area smaller than that defined by said outer perimeter and an area slightly larger than said outer perimeter,
- means for resiliently engaging said lower cutting edge with said backing at successive preselected spaced points on said outer perimeter whereby a portion of a sheet placed between said backing means and said shear blade assembly may be easily and neatly severed from the sheet.

3. In a shear construction for cutting selected portions from a surrounding sheet said shear construction having a means for forming a backing for a sheet to be cut, said means comprising a substantially planar plural sided backing edge forming an outer perimeter, and a shear blade assembly comprising a plurality of shear blades adapted to engage said backing edge successively at preselected spaced points the improvement comprising; at least one resilient shear blade having a plurality of parts with said parts lying in planes angular to one another and with each part having a side forming a cutting edge, said cutting edge being non-coplanar, and means for moving said one blade toward and away from a portion of said outer perimeter with said parts of said edges adapted to be maintained non-coplanar with the portion of said outer perimeter toward which they move whereby said one blade will engage said perimeter simultaneously at a plurality of points.

4. A shear construction for cutting portions of a surrounding sheet comprising,
- tween said backing means and said blade forming a sheet,
- blade forming means having a plurality of cutting edges with at least two of said cutting edges lying opposite each other,
- a slideably mounted adjustment means positioned for locating a selected portion of a sheet to be cut between said backing means and said blade forming means, and
- means for moving said blade forming means towards said backing means with said cutting edges adapted to angularly engage said peripheral edge whereby successive portions of said cutting edge will be engaged by said peripheral edge in a shearing action.

5. A shear construction for cutting portions of a sheet comprising a housing base having mounted thereon:
- a substantially planar backing plate having a plural sided closed continuous peripheral edge forming a backing for a sheet,
- blade forming means comprising a plurality of blades with each blade having a plurality of parts with the parts of each blade lying in planes angular to one another and with each part having a side forming a portion of the cutting edge of said blade, said portions of said cutting edges being non-coplanar, and with the said cutting edges defining a closed continuous cutting element, said closed continuous cutting element defining an area having smaller and larger transverse dimensions than the transverse dimensions of the area defined by said closed continuous peripheral edge,
- means mounting said blades for flexing independently of each other,
- slideably mounted adjustment means positioned for locating a selected portion of a sheet to be cut between said backing means and said blade forming means and comprising a substantially planar frame having spaced parallel upstanding walls at sides thereof, and
- a pivotably mounted actuating arm normally spring tensioned in a raised position for moving said blade forming means towards said backing plate upon actuation whereby successive portions of said cutting edge will be engaged by said peripheral edge in a shearing action.

6. In a shear construction, a spring blade assembly comprising,
- four upwardly extending resilient, spring cutting blades with each blade having a plurality of parts with the parts of each blade lying in planes angular to one another and with one side of each part forming a portion a closed continuous, substantially rectangular cutting edge, said portions of said cutting edge being noncoplanar, and the parts of said cutting edge intermediate the corners bowed inwardly,
- each of said blade being bowed in cross section and having a slot extending upwardly from said cutting edge.

References Cited by the Examiner

UNITED STATES PATENTS

| | | | |
|---|---|---|---|
| 979,219 | 12/10 | Stein | 83—420 |
| 1,473,089 | 11/23 | Faust | 30—229 |
| 1,717,747 | 6/29 | Uttz | 83—649 |
| 2,168,776 | 8/39 | Dugaw | 30—356 |
| 2,255,812 | 9/41 | Rickman | 83—610 |
| 2,423,601 | 7/47 | MacArthur | 83—689 |
| 2,604,166 | 7/52 | Turner | 83—649 |
| 2,670,536 | 3/54 | Harder | 30—299 |
| 2,836,241 | 5/58 | Fritzinger | 83—611 |
| 2,902,713 | 9/59 | Buelow | 30—299 |
| 2,956,465 | 10/60 | Mingo | 30—356 |

FOREIGN PATENTS

| | | |
|---|---|---|
| 123,967 | 3/19 | Great Britain. |

ANDREW R. JUHASZ, *Primary Examiner.*
CARL W. TOMLIN, *Examiner.*